United States Patent

[11] 3,612,376

[72] Inventor Delmar R. Johnson
Des Plaines, Ill.
[21] Appl. No. 24,051
[22] Filed Mar. 24, 1970
[45] Patented Oct. 12, 1971
[73] Assignee Ampex Corporation
Redwood City, Calif.

[54] TAPE TRANSPORT FOR A HELICAL SCAN TAPE RECORDER
4 Claims, 2 Drawing Figs.

[52] U.S. Cl. .......... 226/194, 192/58 A
[51] Int. Cl. .......... G11b 15/50
[50] Field of Search .......... 226/190, 194, 37; 192/58

[56] References Cited

UNITED STATES PATENTS 3,189,273 6/1965 Hellen .......... 192/58 X
3,439,850 4/1969 Johnson .......... 226/190 X

*Primary Examiner*—Allen N. Knowles
*Attorneys*—Anderson, Luedeka, Fitch, Even and Tabin and Robert G. Clay

ABSTRACT: A closed loop capstan for a tape transport of a helical scan, magnetic tape recording and reproducing apparatus. The capstan includes a first portion which is fixedly attached to a shaft of the capstan which fixed portion engages a magnetic tape exiting from a transducing tape loop formed about a scanning assembly. The capstan also includes a second portion which is rotatably coupled to the drive shaft by a viscous damping fluid. This viscous coupled second portion engages the tape as it enters the transducing loop. Thus, the second portion of the capstan rotates relative to the first portion of the capstan but because of the viscous coupling, the torque required to cause rotation thereof is related to the rate of rotation. The capstan thereby effectively isolates supply tape tension fluctuations, but at the same time, passes changes in the level of supply tape tension without attenuation.

PATENTED OCT 12 1971 3,612,376

Figure 1:
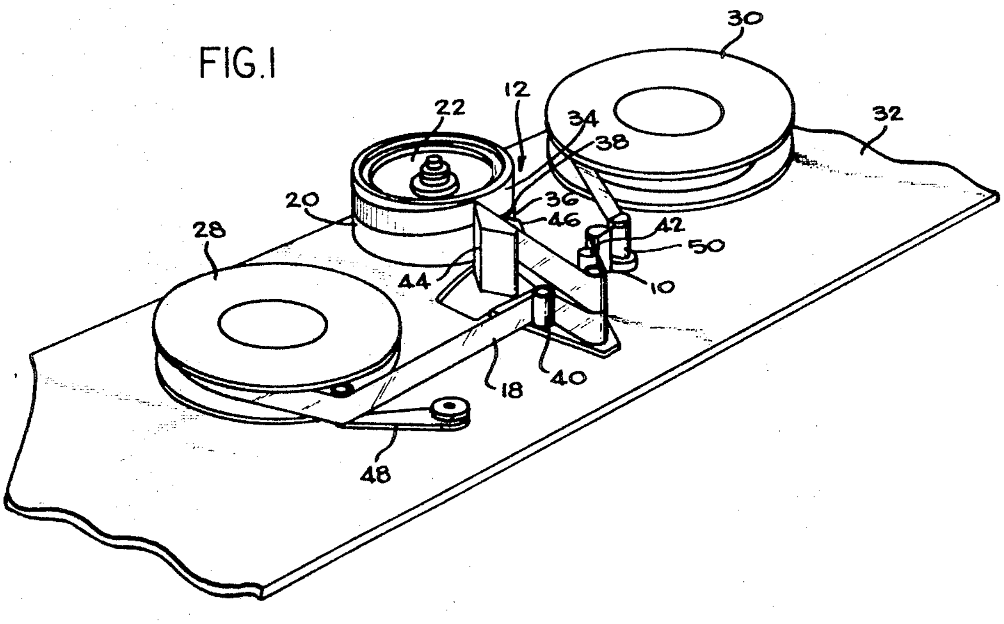

INVENTOR
DELMAR R. JOHNSON

Anderson, Luedeka, Fitch, Even & Tabin
ATTYS.

TAPE TRANSPORT FOR A HELICAL SCAN TAPE RECORDER

This invention relates generally to a tape transport for a helical scan tape recorder and, more particularly, to an improved capstan for regulating the movement of the tape past a transducing head in such recorders.

Tape transports in helical scan tape recorders are designed to coordinate the operations of supplying tape from a supply reel, the tape comprising a flexible base or carrier with a magnetic record medium bonded to the base, feeding the tape from the supply reel past a cylindrical scanner including a rotating transducing head or heads, and then accumulating the tape on a takeup reel after it has passed the scanner. In such operations, the tape is directed from the supply reel, over a series of guides and around the scanner, where signals are transduced onto or from the record medium, and finally onto the takeup reel.

The movement of the tape around the scanner is regulated by a capstan-type tape drive means wherein the tape is engaged by the surface of a cylinder rotating about its axis. The supply and takeup reels are braked and driven, respectively, to maintain appropriate tension in the tape in the supply and takeup runs between the drive means and the respective reels. Generally, the tape tension is increased along the tape path from the supply reel to the takeup reel because of the effects of tape path friction.

An important function of a tape transport is to move the record medium at a substantially constant speed past the transducing head or heads. Failure to perform this function properly will result in time base errors, e.g., the signal is recorded at a different head-to-tape speed than it is reproduced, one part of one scan is recorded or reproduced at a different head-to-tape speed than another part, etc. Because the base or carrier of a tape is more or less elastic so that it is stretched longitudinally or elongated by tension applied to the tape and contracts to its original length when the tension is released, variations in tape tension at a transducing head will cause changes in the stretch of the tape base at that point.

Tape tension control is especially critical in a helical scan recorder because the recording of such a device consists of a series of parallel diagonal tracks that extend diagonally across the tape and typically at a very small angle to the longitudinal axis of the tape. If these tracks are to be played back without time base error between the end of one track and the beginning of the next, it is necessary that the same length of tape exist around the scanner at time of playback as was the case during record. Any of the following factors can cause this not to be the case.

1. Changes in temperature and relative humidity between time of record and playback.

2. Differences in scanner diameter between record and playback recorders.

3. Tape dimensional instabilities at a fixed environment.

4. Differences in tape tension between record and playback.

Of the above factors it is generally practical to control only tape tension at time of playback and thus tape tension control is necessary to compensate for variations in the other three factors.

An obstacle to maintaining a desired tension at the transducing head is the fluctuations in tape tension arising from such factors as irregularities in braking and clutching mechanisms in the tape driving system and electrostatic forces which cause adjacent layers of tape on the reels to stick to one another. One approach to overcoming such problems has been to provide a capstan which engages the tape both before and after it reaches the transducing head. This tends to isolate the transducing region from the rest of the tape path, so that fluctuations in tape tensions in other portions of the tape path do not extend into the transducing region. Recorders utilizing such an approach are referred to as isolated loop or closed loop-types.

In such isolated loop recorders, it has been found advantageous to provide a dual wrap or single capstan where the tape is wrapped on and engages a first portion of the single capstan before and a second portion of the capstan after passing the transducing head. In such recorders the tape may be driven by using one or more pressure rollers to press the tape against the capstan or by wrapping the tape, with a large angular wrap, around a capstan with a surface having a relatively high coefficient of friction with respect to the tape.

In such closed loop systems, the tensions in the tape in the transducing loop are not completely independent of the level of tension outside of the transducing loop but vary with variations in the level of tape tension between the capstan and the supply reel. Furthermore, short term or transient fluctuations in tape tension in the supply run can enter the transducing loop, if they exceed the level of coupling that exists between the capstan and the tape. Various servo means have been provided, therefore, to regulate the tensions outside the transducing loop so that the desired steady state tension in the transducing loop can be controlled.

In a recording system, the tension must increase along the tape path from the beginning of the transducing loop to the end of the loop due to the friction forces exerted on the tape by the various guides and the head in the transducing loop itself. Therefore, the tension is least at the exit of the first area of tape-capstan contact and greatest at the end of the transducing loop where the tape engages the capstan for the second time. Since the tape is elastic, these different tensions cause the tape to be more elongated and thus reduced in cross section at the second contact area than at the first contact area.

The rate at which the mass of the tape is moved is proportional to the product of the tape cross section, the density of the tape, and the linear speed of the tape. For conventional tapes, the density is substantially constant. If a conventional capstan is used in a closed loop drive, the tape is driven at the same linear speed at both the first and second tape-capstan contact areas. Where the cross section of the tape is more at the first contact area, for each mass unit of relatively unstretched tape driven into the transducing loop in a given period of time, less than one mass unit of relatively stretched tape is driven out of the loop. Because in conventional dual wrap capstan systems, this extra mass of tape is not driven out of the transducing loop, tape will accumulate in the loop. This accumulation of tape in the transducing loop will cause the tension at all points in the loop, including the tension at the exit of the first area of contact, to decrease. If the tension at this point is reduced too much, the tape will slip relative to the capstan.

In certain prior art closed loop recorders, these undesirable results have been avoided by removing the tape from the transducing loop at a greater linear rate than it is driven into the loop. For achieving this result, a dual wrap capstan was provided wherein the diameter of the portion of the capstan contacting the exiting tape was made a fixed amount greater than the diameter of the portion of the capstan contacting the entering tape.

This stepped capstan has been effective in isolating supply tape tension disturbance but has certain disadvantages. One of these disadvantages is that the tape tension around the scanner is very sensitive to variations in the difference between the two capstan diameters. Since this difference is very small (e.g., nominally 0.0008 inch), it is very difficult to manufacture capstans that produce identical loop tape tension. Also, experience has shown that the difference between the two capstan diameters can change due to capstan wear.

Another significant disadvantage is that the effectiveness of tape tension control in the transducer loop is substantially reduced by a closed loop capstan that drives the tape at fixed velocity difference, for this velocity difference can only be optimum for one set of tape tension conditions, (e.g., for a one ounce change in supply tape tension, the tape tension around the scanner varies about one-half ounce). Thus, the effective range of tape tension control that can be obtained is reduced. A wide range of tape tension control is desirable and often necessary to eliminate time base error in the playback which, in the case of a video recorder, results in the "hook" in the reproduced picture.

A third disadvantage is that the step in this closed loop capstan is proper for only one set of tape tension conditions and hence, the effectiveness of the stepped closed loop capstan is reduced as the tape tension is varied as is necessary for correcting tape length variations between time of record and playback.

A fourth disadvantage is that the concentricity of the prior art stepped capstan is very critical. For example, a 0.0002 inch capstan eccentricity results in a 0.3 micro second peak-to-peak tension error, cyclic at the capstan rotation rate in one application of such a capstan.

A fifth disadvantage is that the relatively slow rate of change of tension in the transducing loop for changes in the supply tape tension make it difficult to design an automatic tape tension servo.

An object of the present invention is the provision of a capstan for a closed loop tape drive which is effective in isolating supply tape tension disturbances and which eliminates or reduces the problems described above with the prior art stepped capstan.

Another object is the provision of a tape transport for helical scan video tape recorders which tape transport maintains a desired tape tension and a smooth tape movement at a transducing head.

A further object of the invention is the provision of an improved capstan for a closed loop tape transport which allows a wider range of tape tension control.

A still further object is the provision of a capstan for a closed loop tape transport which is relatively easy and inexpensive to manufacture.

Figure 2:
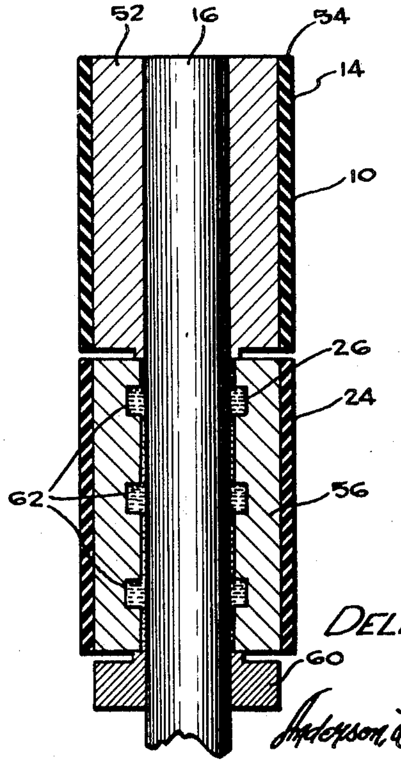

Other objects and advantages of the present invention will become apparent by reference to the following description and accompanying drawings:

FIG. 1 is a fragmentary perspective view of a tape transport for a magnetic tape recording and reproducing system incorporating a capstan constructed in accordance with the present invention; and FIG. 2 is an enlarged vertical cross-sectional view of the capstan shown in FIG. 1.

Briefly, in accordance with the invention, a closed loop capstan 10 is provided for a tape transport 12 of a helical scan, magnetic tape recording and reproducing apparatus. The capstan 10 includes a first portion 14 which is fixedly attached to a shaft 16 of the capstan which fixed portion 14 engages a magnetic tape 18 exiting from a transducing tape loop 20 formed about a scanning assembly 22. The capstan 10 also includes a second portion 24 which is rotatably coupled to the drive shaft 16 by a viscous damping fluid 26. This viscous coupled second portion 24 engages the tape 18 as it enters the transducing loop 20. Thus, the second portion 24 of the capstan 10 rotates relative to the first portion 14 of the capstan, but because of the viscous coupling, the torque required to cause rotation thereof is related to the rate of rotation. The capstan 10 thereby effectively isolates supply tape tension fluctuations, but at the same time, passes changes in the level of supply tape tension without attenuation.

More particularly, the tape transport 12 shown in FIG. 1 includes a supply reel 28 and a takeup reel 30 mounted for rotation upon a tape deck 32 at spaced positions thereon and which serve to store the magnetic tape 18. The supply reel 28 is mounted on the deck surface proper while the takeup reel 30 is mounted on a raised support portion (not shown) so as to be elevated with respect to the supply reel 28, for purposes subsequently described. The supply reel 28 and the takeup reel 30 are coupled to electric drive motors (not shown) in a conventional manner. The motors are arranged to maintain tape tension and to wind up the tape 18 on the takeup reel 30 during record or reproduce operations.

The length of the tape 18 extending between the reels 28 and 30 is wrapped helically about a pair of substantially cylindrical, coaxial and closely spaced drums 34 and 36 which comprise the scanning assembly 22. The lower drum 36 is fixedly supported on the tape deck 32, and the upper drum 34 is mounted for rotation and is rotated at a very high speed by a drive motor (not shown) supported by the tape deck 32. A magnetic transducing head (not shown) is mounted at the lower edge of the upper drum 34 and has a tip which extends outwardly of the drum at the gap 38 between the drums.

In order to facilitate driving and guidance of the tape 18 helically about the scanning assembly 22, the capstan 10 is rotatably mounted on the deck 32 in forward spaced, parallel relationship to the scanning assembly 22. Cylindrical entrance and exit guides 40 and 42 which are parallel to the axis of the capstan 10 are mounted on the deck 32 between the capstan and the scanning assembly 22 and on opposite sides of a line extending between the scanning assembly 22 and the capstan axes. In addition, a pair of retractable tape guides 44 and 46 are slideably mounted on the deck 32 on opposite sides of the line between the capstan and the scanning assembly axes at points between the guides 40 and 42 and the scanning assembly 22.

As shown in FIG. 1, the tape 18 leaving the supply reel 28 is engaged by a tape tension arm 48, extends about the first guide 40, extends around the lower portion 24 of the capstan 10, about a downwardly tapered lower half of the right hand or entrance guide 46, and tangentially upon the lower cylindrical drum 36 of the scanning assembly 22. By virtue of the shape of the entrance guide 46, the tape 18 is twisted slightly to slant the lower half thereof outwardly from the line between the capstan 10 and the drum axes. This twist causes the tape 18 entering the scanning assembly 22 to traverse in an upward path as it extends approximately 360° around the drums 34 and 36 to the exit guide 44. The tape 18 thus extends about the scanning assembly 22 in a helical wrap. The taper of the entrance guide 46 is selected moreover to impart a pitch to the helical wrap which positions substantially the entire width of the tape over the upper drum 34 at a point adjacent the left hand or exit guide 44. The tape 18 then tangentially leaves the upper drum 34 to extend around the left exit guide 44. The exiting tape extends around an upwardly tapered upper half of the exit guide 44, around the upper portion 14 of the capstan 10, about the fixed guide 42 and onto the takeup reel 30. The taper of the upper half of the exit guide 44 is equal, but opposite, to that of the entrance guide 46 such that the tape 18 is twisted to slant the upper edge thereof outwardly from a line between the drum and capstan axes by an amount equal to the outward slant of the lower edge arising from the original twist effecting the helical wrap. Thus, the exiting tape 18 is returned to a path lying in a plane parallel to the deck 32 before it reaches the upper portion 14 of the capstan 10 such that the tape extends uniformly about the capstan 10 and is directed uniformly upon the takeup reel 30 without kinking or twisting. As previously noted, by virtue of the helical wrap, the tape 18 rises in passing around the drums 34 and 36 and it is for this reason that the takeup reel 30 is mounted in elevated position on the raised portion of the tape deck 32. A tape timer 50 is disposed between the capstan 10 and the takeup reel 30.

Although the guidance arrangement of the tape transport 12 illustrated in the drawings, and herein described, is such as to provide an Omega helical wrap about the scanning assembly 22, it is noted that this specific form of wrap is purely exemplary and that other helical wraps extending 360° or more or substantially less than 360° may be employed with the invention by appropriate modification of the tape guidance system. A 180° wrap may, for example, be employed with two heads mounted at diametrically opposite points on a head drum.

Referring now more particularly to FIG. 2, the details of the capstan 10 of the invention may be more clearly seen. The capstan 10 includes the upper tape engaging portion 14 and the lower tape engaging portion 24. The upper portion 14 of the capstan 10 includes a sleeve 52 of a material such as aluminum covered by a coating material 54 having a high coefficient of friction, such as cast polyurethane. The outer surface of the coating material 54 firmly engages the tape 18 after it leaves the transducing loop 20. The vertical dimension of the sleeve 52 is slightly greater than the width of the tape 18. The sleeve 52 is fixedly secured to the vertical shaft 16 extending through the deck 32 and rotatably mounted in a bearing (not shown) secured to the deck 32. The shaft 16 drives the upper portion 14 of the capstan 10, and in turn, is driven by suitable rotatable means (not shown) mounted below the deck 32 which may include conventional provisions for maintaining relatively ely constant angular velocity of the shaft 16, such as a flywheel.

The lower portion 24 of the capstan 10 is formed by a second sleeve 56 which is rotatably mounted on the shaft 16 below the upper sleeve 14. The second sleeve 56 is also covered by a coating material 58 having a high coefficient of friction. The lower sleeve 56 is maintained in its axial position on the shaft 16 by a collar 60 which is rigidly secured to the shaft 16. The lower sleeve 56 is coupled to the drive shaft by the viscous damping fluid 26 disposed in a small clearance (e.g., 0.001 inch) between the internal diameter of the lower sleeve 56 and the outer diameter of the shaft 16. Three annular grooves 62 in the internal diameter of the lower sleeve 56 provide a reservoir for the damping fluid 26. The viscous damping fluid 26 preferably has high kinematic viscosity (e.g., 100,000 to 200,000 centistokes). One fluid which may be used is a DC 200 silicon damping fluid made by Dow Corning.

Normally, because of its viscous state, the fluid 26 stays in position without seals. However, in certain applications, low friction seals may be provided above and below the lower sleeve 56. Also, while the disclosed embodiment is a recorder having capstan which drives the tape without pinch rollers, the invention may also be employed with a recorder having pinch rollers to press the tape against the capstan.

As can be seen from the above, the lower portion 24 of the capstan 10 can rotate relative to the upper portion 14, but because of the viscous coupling, the torque required to cause rotation is related to the rate of rotation. This construction effectively isolates supply tape tension fluctuations, but at the same time, passes changes in the level of supply tape tension without attenuation. Thus, the recorder has an effective tape tension control which is substantially greater than the range provided by prior art recorders without an increase in the range of the tape tension control.

Because the lower portion 24 can rotate relative to the upper portion 14, the diametrical relationship between the upper and lower portions is not critical as in prior art closed loop capstans. The upper versus lower portion diameter tolerance may be increased by at least a factor of 5 to 1. Because of the viscous controlled rotation, the capstan 10 maintains a near ideal closed loop drive for a wide range of tape tension conditions. It has been found that when such a capstan is employed in a tape drive without pressure rollers the level of takeup tape tension could be reduced as compared to when the stepped capstan was used. This apparently is the case because the step was only correct for one set of tension conditions and thus there had to be tape-to-capstan slip for any other set of tension conditions. This step caused the capstan to rapidly become coated with tape oxide and thus lose its high coefficient of friction. The lower takeup tension is advantageous not only because the load and hence wear, in the takeup drive system is reduced, but also lower play-record takeup tension improves the tape pack on the takeup reel. Also, the capstan 10 improves the response of an automatic tension servo employed with the recorder.

Various changes and modifications may be made in the above disclosed capstan without deviating from the spirit or scope of the present invention. Various features of the invention are set forth in the accompanying claims.

What is claimed is:

1. In a helical scan type of magnetic tape apparatus, wherein a magnetic recording tape follows a tape path including successively a supply run, a closed transducing loop, at least one transducing head positioned in said transducing loop, and a takeup run, a capstan comprising a shaft, first and second coaxial cylindrical portions disposed on said shaft in axially displaced relationship, said first portion being fixedly coupled to said shaft, said second portion being rotatably mounted on said shaft, and a viscous damping fluid coupling said second portion to said shaft, the tape entering said transducing loop contacting said second portion and the tape exiting from said transducing loop contacting said first portion.

2. Apparatus according to claim 1, wherein the internal diameter of said second portion of said capstan is spaced from the outer diameter of said shaft by a small clearance, and the viscous damping fluid is disposed in said clearance.

3. Apparatus according to claim 2, wherein annular recesses are provided in said internal diameter which serve as reservoirs for the viscous fluid.

4. Apparatus according to claim 1, wherein the viscous fluid has a high kinematic viscosity.